(12) United States Patent
Ogata et al.

(10) Patent No.: US 7,468,898 B2
(45) Date of Patent: Dec. 23, 2008

(54) DC-DC CONVERTER WITH SWITCHABLE CAPACITORS

(75) Inventors: Takashige Ogata, Gunma (JP); Tatsuya Suzuki, Saitama-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/191,242

(22) Filed: Jul. 28, 2005

(65) Prior Publication Data

US 2006/0028849 A1    Feb. 9, 2006

(30) Foreign Application Priority Data

Jul. 29, 2004    (JP)    ............... 2004-221437

(51) Int. Cl.
 H02M 3/18    (2006.01)
 H02M 7/00    (2006.01)
 H02M 7/19    (2006.01)
(52) U.S. Cl. ............... 363/59; 363/60; 307/110; 307/109
(58) Field of Classification Search ............... 363/59, 363/62, 60; 307/110, 109
See application file for complete search history.

(56) References Cited

U.S. PATENT DOCUMENTS

| 4,451,743 | A | * | 5/1984 | Suzuki et al. | ............... | 307/110 |
| 4,531,113 | A | * | 7/1985 | Abraham | ............... | 341/136 |
| 5,434,569 | A | * | 7/1995 | Yung et al. | ............... | 341/172 |
| 5,581,454 | A | * | 12/1996 | Collins | ............... | 363/59 |
| 6,198,645 | B1 | * | 3/2001 | Kotowski et al. | ............... | 363/59 |
| 6,834,001 | B2 | | 12/2004 | Myono | | |
| 6,985,024 | B2 | * | 1/2006 | Geen | ............... | 327/536 |

FOREIGN PATENT DOCUMENTS

JP    09-163719    6/1997
JP    2003-111385 A    4/2003

* cited by examiner

*Primary Examiner*—Bao Q Vu
(74) *Attorney, Agent, or Firm*—Morrison & Foerster LLP

(57) ABSTRACT

A step down DC-DC converter is reduced in the cost by reducing a number of capacitors included. The DC-DC converter is provided with switches that connect (n−1) capacitors in parallel with each other and switches that connect the capacitors in series with each other. In phase 1, some switches are turned on to connect the capacitors in parallel between an output terminal and a ground voltage so that the capacitors are charged. In phase 2, other switches are turned on to connect the capacitors in series between the output terminal and an input voltage so that the capacitors are discharged. A stepped down output voltage, that is 1/n times of the input voltage, is obtained by alternating the phase 1 and the phase 2 until a stable state is reached.

12 Claims, 6 Drawing Sheets

FIG.3

| | | S1 | S2 | S3 | S4 | S5 | S6 |
|---|---|---|---|---|---|---|---|
| First Example of Operation (1/n Vin) | Phase 1 | × | × | × | ○ | ○ | × |
| | Phase 2 | ○ | × | × | × | × | ○ |
| Second Example of Operation ((n−1)/n Vin) | Phase 1 | × | × | ○ | × | × | ○ |
| | Phase 2 | × | ○ | × | × | ○ | × |

| | | SWA1~SWAn−2 | SWAn−1 | SWB1~SWBn−2 | SWC1~SWCn−2 |
|---|---|---|---|---|---|
| First Example of Operation (1/n Vin) | Phase 1 | ○ | ○ | × | ○ |
| | Phase 2 | × | ○ | ○ | × |
| Second Example of Operation ((n−1)/n Vin) | Phase 1 | × | ○ | ○ | × |
| | Phase 2 | ○ | ○ | × | ○ |

DC-DC CONVERTER WITH SWITCHABLE CAPACITORS

CROSS-REFERENCE OF THE INVENTION

This invention is based on Japanese Patent Application No. 2004-221437, the content of which is incorporated herein by reference in its entirety.

BACKGROUND OF THE INVENTION

1. Field of the Invention

This invention relates to a DC-DC converter, specifically to a DC-DC converter having a function to step down an input voltage.

2. Description of the Related Art

DC-DC converters are circuits that change a certain DC input voltage into another DC voltage, and are used in a power supply circuit of an LSI and the like. Among the DC-DC converters, a step-down DC-DC converter that has a function to step down an input voltage is well known.

This type of DC-DC converter is explained hereinafter referring to FIGS. 4A and 4B. C1-Cn are n capacitors switchable between a series connection and a parallel connection. Cout is an output capacitor (smoothing capacitor). The DC-DC converter is structured so that the n capacitors C1-Cn can be alternated by a switching circuit (not shown) between a status of series connection as shown in FIG. 4A and a status of parallel connection as shown in FIG. 4B. The status shown in FIG. 4A is called phase 1 and the status shown in FIG. 4B is called phase 2 hereafter. All the capacitors C1-Cn have the same capacitance.

The capacitors C1-Cn are connected in series between an input voltage Vin (DC voltage) and a ground voltage Vss (0V) in the phase 1. In this phase, the capacitors C1-Cn are charged with electric charges corresponding to a voltage $(1/n) \cdot Vin$ that is Vin multiplied by $1/n$. In the phase 2, on the other hand, the capacitors C1-Cn are connected in parallel between the ground voltage Vss (0V) and an output terminal to which electric charges stored in the capacitors C1-Cn are discharged. An output voltage Vout obtained at the output terminal is represented by the following equation, $Vout=(1/n) \cdot Vin$, which means that the input voltage multiplied by $1/n$ is obtained at the output terminal. Therefore, a stepped down voltage that is the input voltage Vin divided by n is obtained as the output voltage Vout by alternating between the phase 1 and the phase 2. Further description on the technologies mentioned above is found in Japanese Patent Application Publication No. H09-163719, for example.

However, the DC-DC converter described above requires n capacitors in order to multiply the input voltage Vin by $1/n$, causing a problem of increased cost.

SUMMARY OF THE INVENTION

This invention offers a DC-DC converter including $(n-1)$ capacitors switchable between a series connection and a parallel connection and outputs an output voltage Vout, that is an input voltage Vin multiplied by $1/n$, with less number of capacitors than conventional DC-DC converters, by alternating between a status in which the $(n-1)$ capacitors are connected in parallel between an output terminal and a ground voltage and a status in which the $(n-1)$ capacitors are connected in series between an input voltage Vin and the output terminal.

BRIEF DESCRIPTION OF THE DRAWINGS

FIG. 3 shows switching in the operation of the DC-DC converter according to the embodiment of this invention.

DETAILED DESCRIPTION OF THE INVENTION

Figure 1A:
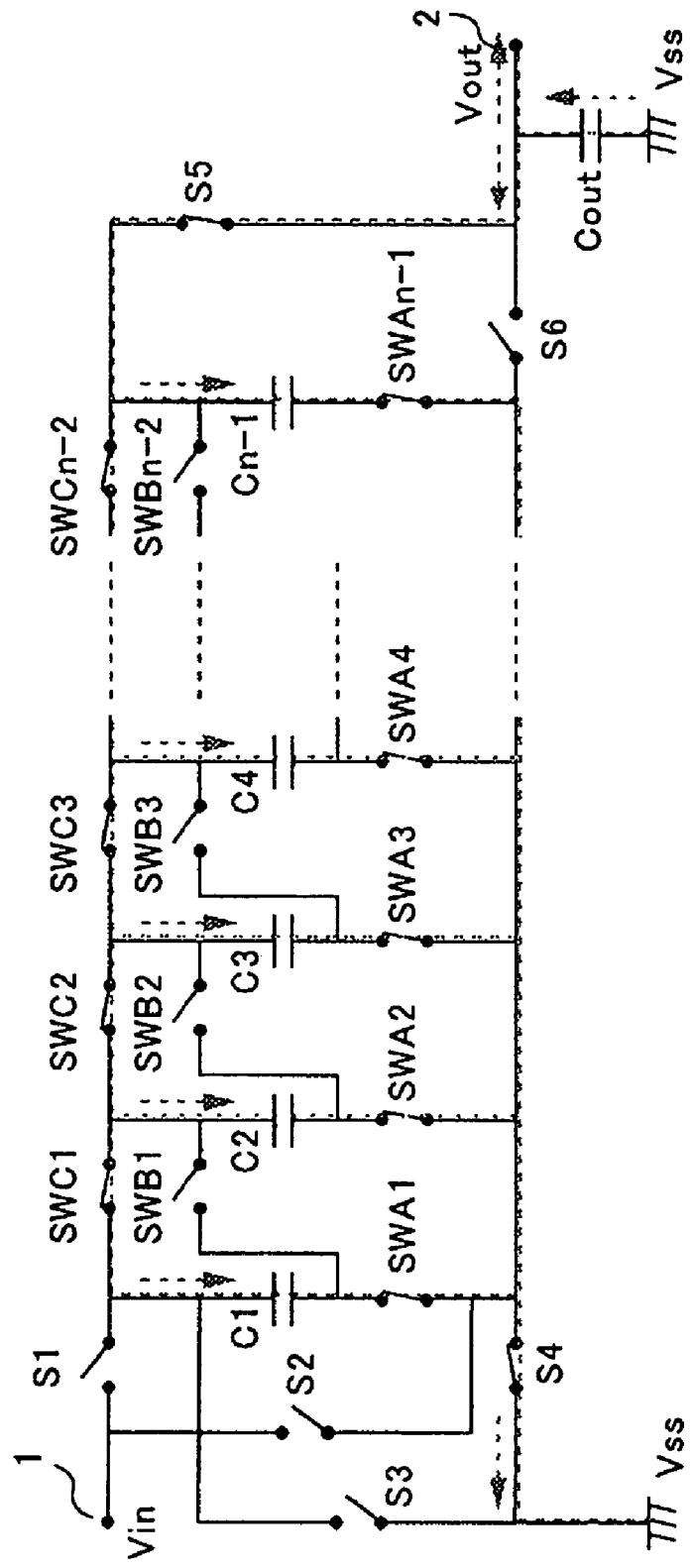
FIGS. 1A and 1B are circuit diagrams showing a first example of operation of a DC-DC converter according to an embodiment of this invention.
Figure 1B:
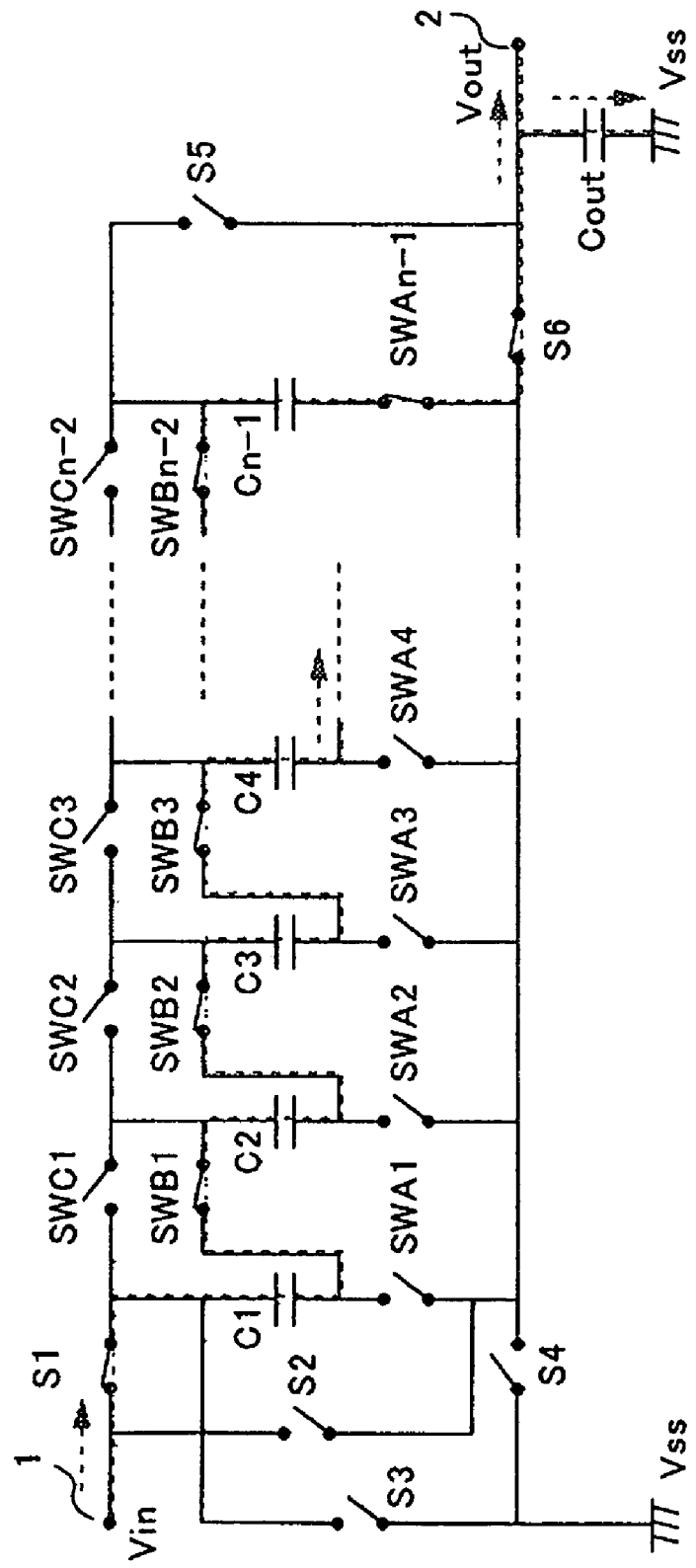
Figure 2A:
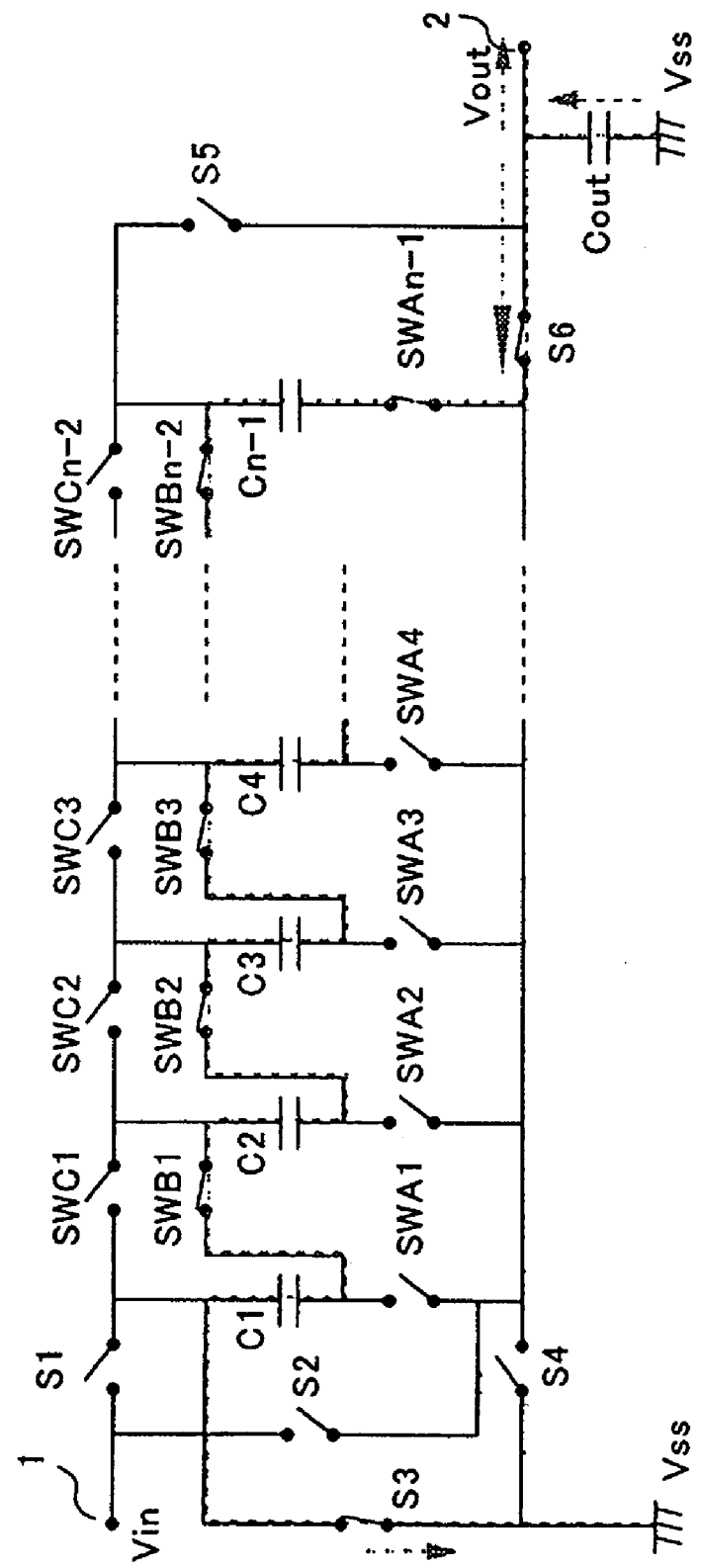
FIGS. 2A and 2B are circuit diagrams showing a second example of operation of the DC-DC converter according to the embodiment of this invention.
Figure 2B:
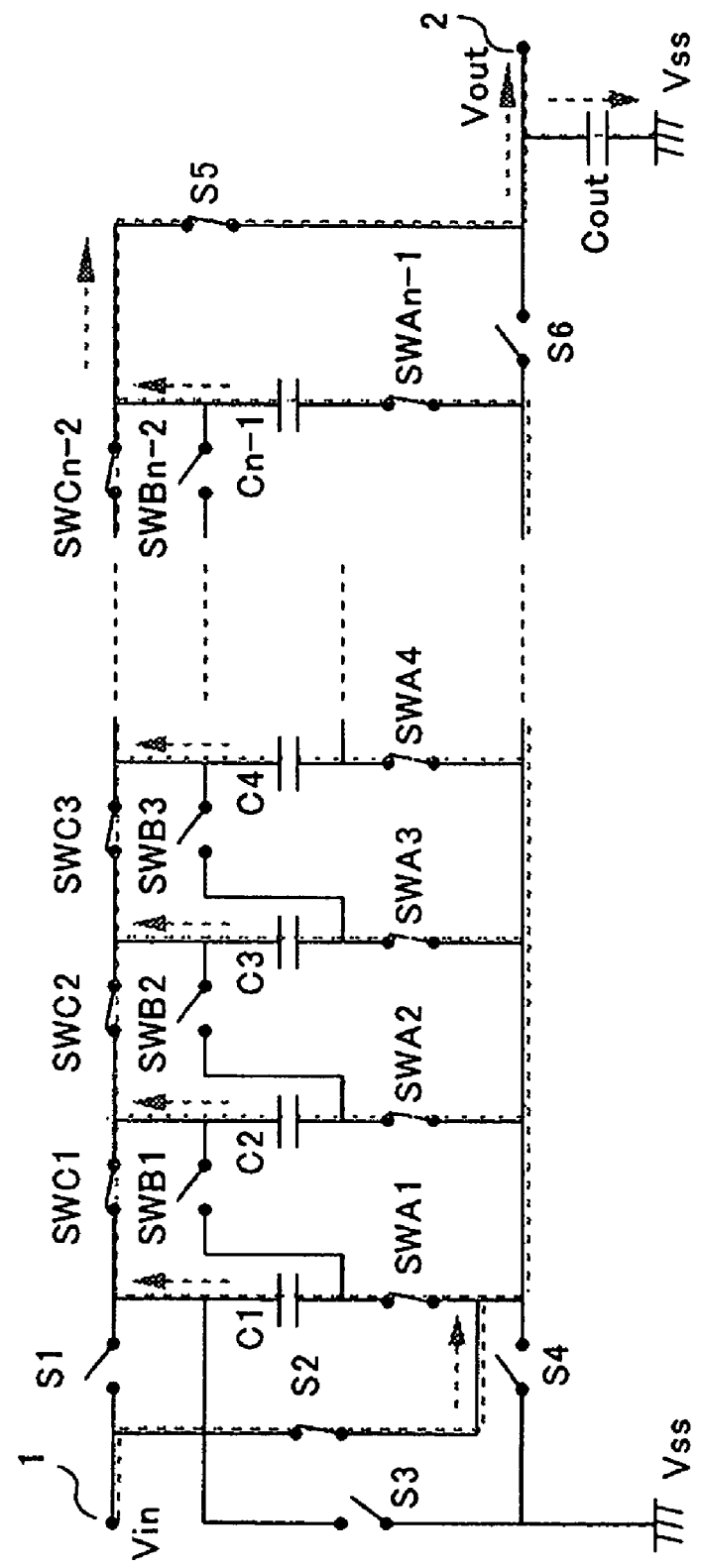
Figure 4A:
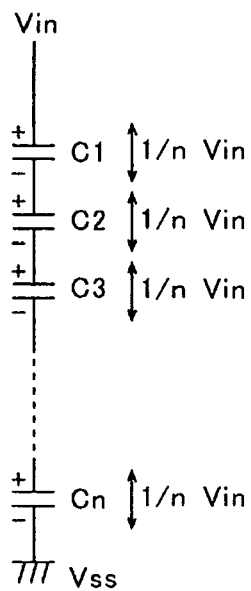
FIGS. 4A and 4B are circuit diagrams showing a DC-DC converter according to a conventional art.
Figure 4B:
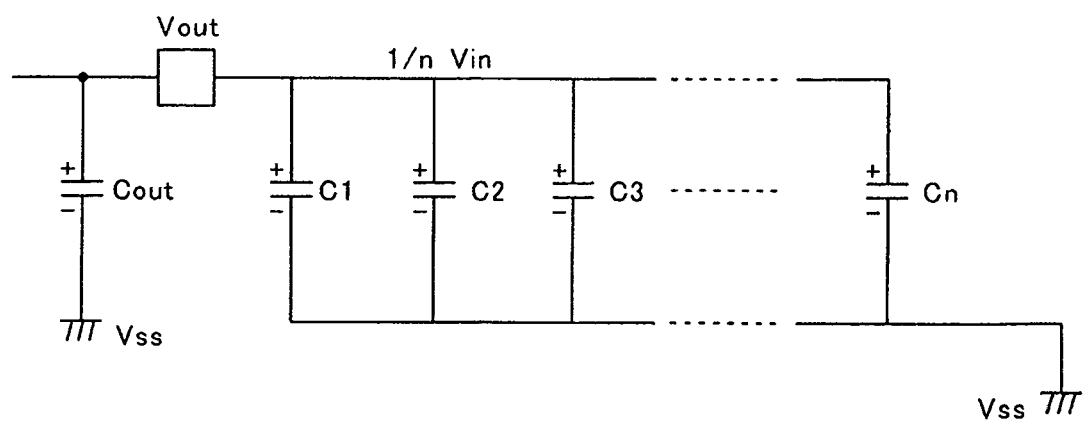

A DC-DC converter according to an embodiment of this invention will be explained hereafter referring to the drawings. FIGS. 1A, 1B, 2A and 2B are circuit diagrams showing the DC-DC converter. FIGS. 1A and 1B are to explain a structure and an operation of a circuit that steps down an input voltage Vin to $1/n$ times of Vin. FIGS. 2A and 2B are to explain a structure and an operation of a circuit that steps down the input voltage Vin to $(n-1)/n$ times of Vin. The n is a natural number larger than one. The circuit shown in FIGS. 1A and 1B has the same circuit structure as the circuit shown in FIGS. 2A and 2B. Difference between them is only in a way of switching.

In FIGS. 1A, 1B, 2A and 2B, C1-Cn-1 are $(n-1)$ capacitors switchable between a series connection and a parallel connection by the operation of switches SWA1-SWAn-1, SWB1-SWBn-2 and SWC1-SWCn-2. The capacitors C1-Cn-1 are connected in parallel with each other when the switches SWA1-SWAn-1 and SWC1-SWCn-2 are turned on while the switches SWB1-SWBn-2 are turned off. The capacitors C1-Cn-1 are connected in series with each other when the switches SWAn-1 and SWB1-SWBn-2 are turned on while the switches SWA1-SWAn-2 and SWC1-SWCn-2 are turned off. Capacitances of the capacitors C1-Cn-1 may be of any values. All of them may be of the same value. Or, at least one of the capacitors may have a capacitance different from the capacitance of the rest of the capacitors. That is, all the capacitances of the capacitors C1-Cn-1 may be different from each other, or some of the capacitances may be the same while the rest of the capacitances are different.

S1 is a switch provided between an input terminal 1 to which the input voltage Vin is applied and one end of the capacitor C1, S2 is a switch provided between the input terminal 1 and the other end of the capacitor C1, S3 is a switch provided between the one end of the capacitor C1 and a ground voltage Vss (0V), S4 is a switch provided between the other end of the capacitor C1 and the ground voltage Vss, S5 is a switch provided between the switch SWCn-2 and an output terminal 2 from which an output voltage Vout is obtained, S6 is a switch provided between the switch SWAn-1 and the output terminal 2, and Cout is an output capacitor (smoothing capacitor) connected between the output terminal 2 and the ground voltage Vss. All the switches can be formed of MOS transistors.

Next, a first example of the operation of the DC-DC converter having the structure described above will be explained referring to FIGS. 1A, 1B and 3. In this embodiment, all the capacitors C1-Cn-1 have the same capacitance. FIG. 3 shows switching in the operation of the DC-DC converter. The symbol "0" in FIG. 3 denotes that the switch is turned on, and the symbol "X" denotes that the switch is turned off. The status shown in FIG. 1A is called phase 1 and the status shown in FIG. 1B is called phase 2 hereafter. Each of arrows in FIGS. 1A and 1B shows a direction of an electric current.

In the phase 1, the switches SWA1-SWAn-1 and the switches SWC1-SWCn-2 are turned on while the switches SWB1-SWBn-2 are turned off, as shown in FIG. 3. And the switches S4 and S5 are turned on, while the switches S1, S2, S3 and S6 are turned off. As a result, (n−1) capacitors C1-Cn-1 are connected in parallel with each other and connected between the output terminal 2 and the ground voltage Vss. Thus, electric charges corresponding to the output voltage Vout are discharged from the output capacitor Cout, and electric charges corresponding to the output voltage Vout are charged to each of the capacitors C1-Cn-1.

In the phase 2, the switches SWAn-1 and SWB1-SWBn-2 are turned on while the switches SWA1-SWAn-2 and the switches SWC1-SWCn-2 are turned off, as shown in FIG. 3. And the switches S1 and S6 are turned on, while the switches, S2, S3, S4 and S5 are turned off. As a result, the capacitors C1-Cn-1 are connected in series with each other and connected between the input voltage Vin (that is, the input terminal 1 to which the input voltage Vin is applied) and the output voltage Vout. Thus, electric charges corresponding to the output voltage Vout are charged to the output capacitor Cout, and electric charges corresponding to a voltage Vin−Vout·(n−1) are discharged from the capacitor Cn-1.

By alternating the phase 1 and the phase 2 until a stable state is reached, a following equation holds.

$$Vin-Vout\cdot(n-1)=Vout$$

Vout=(1/n)·Vin is derived from the equation above, meaning that a stepped down output voltage Vout, that is 1/n times of the input voltage Vin, is obtained. In this embodiment, the number of the alternation between the phase 1 and the phase 2 is about 8000.

And the number of capacitors subject to the alternation between the series connection and the parallel connection can be reduced by chaning the switching of the switches SWA1-SWAn-1, SWB1-SWBn-2 and SWC1-SWCn-2 individually while keeping the switching of the switches S1-S6 unchanged in the phase 1 and phase 2. Thus, with the same circuit structure, (n−1) different voltages of the output voltage Vout, that are the input voltage Vin multiplied by 1/n, 1/(n−1), 1/(n−2), ..., ½, can be obtained.

Next, a second example of operation of the DC-DC converter having the structure described above will be explained referring to FIGS. 2A, 2B and 3. In this embodiment, all the capacitors C1-Cn-1 have the same capacitance. The status shown in FIG. 2A is called phase 1 and the status shown in FIG. 2B is called phase 2 hereafter. Each of arrows in FIGS. 2A and 2B shows a direction of an electric current.

In the phase 1, the switches SWAn-1 and SWB1-SWBn-2 are turned on while the switches SWA1-SWAn-2 and the switches SWC1-SWCn-2 are turned off, as shown in FIG. 3. And the switches S3 and S6 are turned on, while the switches, S1, S2, S4 and S5 are turned off. As a result, the capacitors C1-Cn-1 are connected in series with each other and connected between the output voltage Vout and the ground voltage Vss. Thus, electric charges corresponding to the output voltage Vout are discharged from the output capacitor Cout, and electric charges corresponding to a voltage Vout/(n−1) are charged to each of the capacitors C1-Cn-1.

And in the phase 2, the switches SWA1-SWAn-1 and the switches SWC1-SWCn-2 are turned on while the switches SWB1-SWBn-2 are turned off, as shown in FIG. 3. And the switches S2 and S5 are turned on, while the switches S1, S3, S4 and S6 are turned off. As a result, the capacitors C1-Cn-1 are connected in parallel with each other and connected between the input voltage Vin and the output voltage Vout. Thus, electric charges corresponding to the output voltage Vout are charged to the output capacitor Cout, and electric charges corresponding to a voltage Vin−Vout(n−1) are discharged from each of the capacitors C1-Cn-1.

By alternating the phase 1 and the phase 2 until a stable state is reached, a following equation holds.

$$Vin-Vout\cdot(n-1)=Vout$$

Vout=(1/n)·Vin is derived from the equation above, meaning that a stepped down output voltage Vout, that is 1/n times of the input voltage Vin, is obtained. In this embodiment, the number of the alternation between the phase 1 and the phase 2 is about 8000.

And the number of capacitors subject to the alternation between the series connection and the parallel connection can be reduced by changing the switching of the switches SWA1-SWAn-1, SWB1-SWBn-2 and SWC1-SWCn-2 individually while keeping the switching of the switches S1-S6 unchanged in the phase 1 and phase 2. Thus, with the same circuit structure, (n−1) different voltages of the output voltage Vout, that are the input voltage Vin multiplied by ½, ⅔, ..., (n−1)/n, can be obtained.

The input voltage Vin can be stepped down to 1/n times of Vin using (n−1) capacitors, according to the DC-DC converter of this invention. That is, the number of capacitors can be reduced by one compared with the conventional DC-DC converter, enabling reduction in the cost of the DC-DC converter. Also, the input voltage Vin can be stepped down to (n−1)/n times of Vin using (n−1) capacitors, according to the DC-DC converter of this invention.

What is claimed is:

1. A DC-DC converter comprising:
    a plurality of switchable capacitors including a first capacitor and a second capacitor;
    an output terminal;
    a switching circuit that connects the plurality of switchable capacitors in parallel with each other between the output terminal and a ground voltage in a first phase and connects the plurality of switchable capacitors in series with each other between the output terminal and an input voltage in a second phase, and
    an output capacitor,
    wherein the output capacitor is provided between the output terminal and the ground voltage,
    wherein the output terminal is electrically connected with the plurality of switchable capacitors in the first and second phases,
    wherein the switching circuit comprises a first switch provided between an input terminal to which the input voltage is applied and a first end of the first capacitor, a second switch provided between a second end of the first capacitor and the ground voltage, a third switch provided between a first end of the second capacitor and the output terminal from which an output voltage is obtained and a fourth switch provided between a second end of the second capacitor and the output terminal, and
    wherein, in the first phase, the output capacitor is discharged and the plurality of switchable capacitors are charged, and in the second phase, the output capacitor is charged and the plurality of switchable capacitors are discharged.

2. A DC-DC converter comprising:
    a plurality of switchable capacitors including a first capacitor and a second capacitor;
    an output terminal;

a switching circuit that connects the plurality of switchable capacitors in series with each other between the output terminal and a ground voltage in a first phase and connects the plurality of switchable capacitors in parallel with each other between the output terminal and an input voltage in a second phase, and an output capacitor, wherein the output capacitor is provided between the output terminal and the ground voltage, wherein the output terminal is electrically connected with the plurality of switchable capacitors in the first and second phases, wherein the switching circuit comprises a first switch provided between an input terminal and a second end of the first capacitor, a second switch provided between a first end of the first capacitor and the ground voltage, a third switch provided between a first end of the second capacitor and the output terminal from which an output voltage is obtained and a fourth switch provided between a second end of the second capacitor and the output terminal; and wherein, in the first phase, the output capacitor is discharged and the plurality of switchable capacitors are charged, and in the second phase, the output capacitor is charged and the plurality of switchable capacitors are discharged.

3. The DC-DC converter of claim 1, wherein each of the plurality of switchable capacitors has a same capacitance.

4. The DC-DC converter of claim 2, wherein each of the plurality of switchable capacitors has a same capacitance.

5. The DC-DC converter of claim 1, wherein one of the plurality of switchable capacitors has a capacitance that is different from a capacitance of another of the plurality of switchable capacitors.

6. The DC-DC converter of claim 2, wherein one of the plurality of switchable capacitors has a capacitance that is different from a capacitance of another of the plurality of switchable capacitors.

7. The DC-DC converter of claim 1, wherein the switching circuit comprises more than one switch comprising MOS transistors.

8. The DC-DC converter of claim 2, wherein the switching circuit comprises more than one switch comprising MOS transistors.

9. The DC-DC converter of claim 1, wherein the switching circuit alternates the first phase and the second phase so that a stable stepped down output voltage is outputted from the output terminal.

10. The DC-DC converter of claim 2, wherein the switching circuit alternates the first phase and the second phase so that a stable stepped down output voltage is outputted from the output terminal.

11. The DC-DC converter of claim 1, wherein the output capacitor is electrically connected with the output terminal and the ground voltage in the first and second phases.

12. The DC-DC converter of claim 2, wherein the output capacitor is electrically connected with the output terminal and the ground voltage in the first and second phases.

* * * * *